Aug. 1, 1950 N. H. YOUNG, JR 2,516,937
RECEIVER CIRCUIT
Filed April 19, 1946
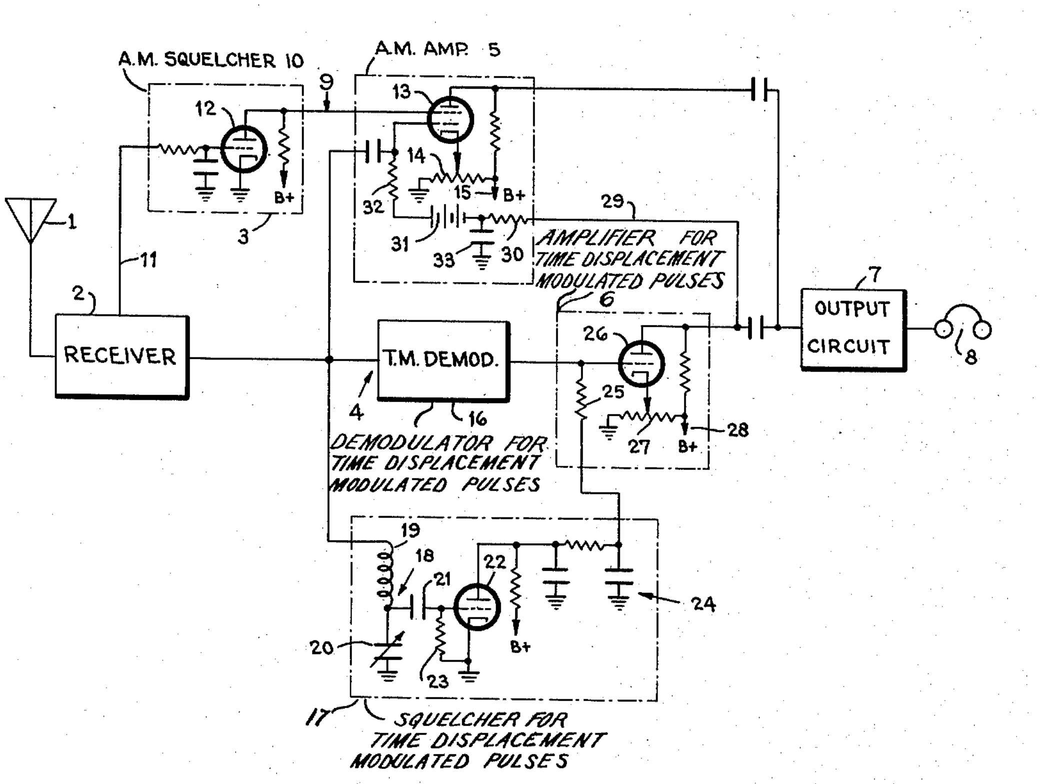
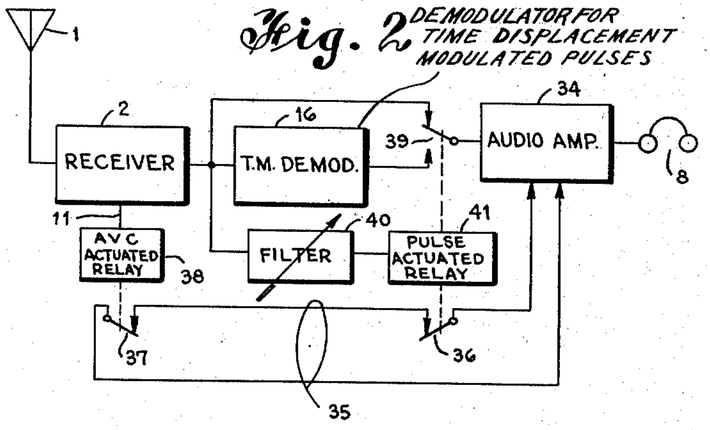
Fig. 2
INVENTOR.
NORMAN H. YOUNG, JR.
BY
ATTORNEY Patented Aug. 1, 1950

2,516,937

UNITED STATES PATENT OFFICE 2,516,937

RECEIVER CIRCUIT

Norman H. Young, Jr., Jackson Heights, N. Y., assignor to Federal Telephone and Radio Corporation, New York, N. Y., a corporation of Delaware Application April 19, 1946, Serial No. 663,291

2 Claims. (Cl. 250—20)

This invention relates to receiver circuits, particularly those utilizing automatic volume controls and squelcher circuits.

Over a given transmission channel (e. g. a given carrier frequency) signals of different types, such as for example, amplitude-modulated signals and time displacement modulated pulse signals, or time modulation signals of different repetition rates, may be transmitted. In certain receivers, it is desirable when two types of signals are being simultaneously received to preferentially select one type.

In receivers using automatic volume control, there is a tendency, when no signals are being received, for the gain of the receiver to be increased so that microphonic hissing and other noises become perceptible in the receiver. To prevent these noises becoming perceptible, squelcher circuits are employed.

In accordance with a feature of the present invention, squelcher circuits not only serve their function of squelching, but in addition, have the combined function of controlling the selection of one type of signal over another.

An object of the present invention is the provision of an improved receiver for selectively receiving signals of a desired type.

Another object is the provision of a receiver for preferentially selecting signals of one type over that of another type which is being received on the same transmission channel.

A further object is the provision of a receiver for selectively receiving signals of a given type which utilizes squelcher circuits in controlling the selection of the preferred type of signals.

Other and further objects will become apparent and the invention will be best understood from the following description of embodiments thereof, reference being had to the drawings, in which:

Fig. 1 is a schematic and block diagram of a receiver embodying the present invention; and Fig. 2 is a block diagram of a modified type of a receiver embodying my invention.

Referring now to Fig. 1, energy may be transmitted over any suitable transmission channel as for example, by radiation, and may be received on antenna 1, and fed to a receiver 2, which will demodulate the signal, that is, remove the carrier frequency. The receiver 2 is provided with automatic volume control to control its gain and maintain its output at a fairly constant amplitude level.

The output of the receiver may be amplitude-modulated signals or time displacement modulated pulse signals. These are fed into two channels 3 and 4, for amplitude-modulated signals and time-modulated pulse signals respectively. Channels 3 and 4 each include amplifiers 5 and 6 feeding to a common output circuit 7 and a utilization device, such as a loud speaker 8.

Normally (i. e. in the absence of any signals), amplifiers 5 and 6 are both blocked, preventing signals and noises from going to the output circuit 7. The blocking voltages for amplifier 5 are applied over a line 9 from a squelcher circuit 10, which squelched circuit is controlled by the A. V. C. of the receiver over line 11. These blocking voltages are produced in the squelcher 10 due to the conduction of tube 12, which is normally unbiased and therefore conducts, making the anode of tube 12 negative and applying this negative voltage over line 9 to the second grid of a tetrode 13 in amplifier 5. When, however, an incoming signal, whether amplitude modulated or time modulated, is received, the A. V. C. develops a negative voltage over line 11 which is applied to the grid of tube 12, causing the anode to become more positive and unblocking tube 13 so as to permit signals applied to the control grid of tube 13 to be passed through to the output circuit. The proper bias for tube 13 is controlled by means of a potentiometer 14 whose movable arm is connected to the cathode of tube 13 and whose resistor is coupled between a positive and a negative side of a source of voltage 15, which may be for example, the source of anode potential for tube 13.

While amplitude-modulated signals will therefore pass through amplifier 5, whatever components thereof pass through the demodulator 16 in channel 4, will not pass the amplifier 6 which is coupled to the output of the demodulator 16 since the amplifier 6 is blocked as described below. Thus any signals serve to produce a first order of selection.

If time displacement modulated signals of the selected repetition rate are received alone or simultaneously with amplitude-modulated signals, the squelcher 10 will operate to open up amplifier 5 as far as the potential applied to the second grid of tube 13 is concerned. However, in accordance with a feature of the present invention, this tube still remains blocked due to another potential applied to the first or control grid of tube 13 under the control of a pulse squelcher 17. Thus, no signals will pass through amplifier 5 when time-modulated pulses of the selected repetition rate are received. At the same time the amplifier 6 is opened so as to permit the pulse signals along the time modulated channel 4 to pass therethrough to output. The foregoing is accomplished by the following means. The output of the receiver, which consists of time-modulated pulses of the desired repetition rate with possibly other types of signals, is applied to the input of the squelcher 17. The squelcher 17 includes a series resonant circuit 18 which may consist, for example, of an inductance 19 and a variable condenser 20 in series with each other. Circuit 18 is tuned to a frequency equal to the normal or unmodulated repetition frequency of the desired pulses or, to a harmonic thereof. Since the time displacement modulation of pulses is a very small fraction of their spacing, this modulation will not substantially deviate from the average or unmodulated repetition rate insofar as the tuning of the circuit 18 is concerned. When pulses of the desired repetition rate are received, they will produce a maximum difference of potential between the mid-point between the inductance 19 and the condenser 20, and ground, which potential at said mid-point is applied through a condenser 21 to the grid of a tube 22 in a grid-leak detector circuit in which the grid is also connected to ground through a grid-leak resistor 23. The tube 22 is otherwise unbiased so that when said potential is applied to the condenser 21, at the instant that said potential is positive, it will cause the grid of tube 22 to draw current and charge up the condenser 21 in such a direction that an average negative voltage is applied to said grid. This causes the anode of tube 22 to become more positive and this more positive voltage is applied through a suitable filter, such as a low pass filter 24 over a resistor 25 to the grid of tube 26 in amplifier 6. Tube 26 is normally blocked by means of an adjustable voltage derived from a potentiometer 27 connected to a suitable source 28 which may be the source of anode potential. The maximum voltage derived from filter 24 unblocks tube 26 so as to permit the energy from the demodulator 16 to pass through tube 26 to the output circuit. Other positive voltages obtained from filter 14 as a result of pulses having a repetition rate not equal to the desired rate will be insufficient to unblock tube 26.

Thus when time-modulated pulses of the proper repetition rate are received, the squelcher circuit 17 opens up amplifier 6 and permits the demodulated pulse signals to go out to the output. At the same time, the opening of amplifier 6 blocks amplifier 5. Thus is produced a second order of selection, which supercedes the first order of selection. This is preferably accomplished as follows. The voltage from the squelcher 17 which unblocks tube 26 is positive. This positive voltage applied to the grid tends to make the D. C. level of the anode of tube 26 more negative. This negative D. C. component is then applied over line 29 and through a very large resistor 30 in bucking relationship to a battery 31 which normally is connected through resistor 32 so as to apply a positive voltage to the control grid. Potentiometer 14, controlling the bias applied to the cathode, is adjusted with relationship to biasing battery 31 so that tube 13 would normally conduct when squelcher 10 unblocks the second grid of tube 13 and no pulse signals of the selected repetition rate are being received. When, however, time-modulated pulses of the selected repetition rate are being received and a negative voltage is being applied from the amplifier 6 over line 29, to buck the voltage of battery 31, thereupon tube 13 is blocked by the resulting negative voltage applied to the first or control grid thereof. To prevent any of the audio frequency components from passing through tube 13 or otherwise affecting it, resistor 30 is made relatively high in value and the mid-point between resistor 30 and source of potential 31 is connected to ground through a very large condenser 33.

In the embodiment illustrated in Fig. 2, use is made of relays instead of electronic controls for selecting signals of the type desired.

Referring now to the embodiment illustrated in Fig. 2, the output of receiver 2 is passed through an audio amplifier 34 to the utilization device 8. However, amplifier 34, in the absence of signals, is shorted by means of a circuit 35 including two single throw switches 36 and 37, arranged in series with each other. These switches are normally closed, so that ordinarily in the absence of any signals the audio amplifier 34 cannot transmit anything to the output. When amplitude-modulated signals are received, the automatic volume control voltage rises and is applied over line 11 to a relay 38. The relay 38 thereupon opens switch 37 (which forms part of said relay) and the output of receiver 2 then passes through a single pole double throw switch 39 to audio amplifier 34, the audio amplifier 34 no longer being shorted by circuit 35 and therefore amplifying the signal and passing it on to the output.

When time displacement modulated pulse signals of the selected frequency are being received, the relay 38 will operate to open switch 37, thus putting amplifier 34 in condition to pass the signal. At the same time, the pulses are passed to a time-modulated pulse demodulator 16 and to a filter 40 selectively tuned to the normal repetition rate of the desired pulses. A maximum voltage is therefore obtained in filter 40 (which filter may be similar to tuned circuit 18 of the squelcher 17 of Fig. 1) from pulses of the desired repetition rate, and lesser voltages from pulses of other rates. These voltages are applied to a pulse-actuated relay 41, the relay 41 having as parts thereof, switch 39 and switch 36. The relay only operates when the applied voltage is a maximum. The relay 41 opens switch 36 doubly assuring that audio amplifier 34 is not shorted and at the same time moves the arm of switch 39 to the lower contact which is connected to the output of the demodulator 16. Thus time displacement modulated pulses of the desired repetition rate are passed through to audio amplifier 34. At the same time amplitude-modulated pulses which cannot pass through the demodulator 16 are cut off.

In addition to the above mentioned reasons, relay 36 is included because, in many systems of time modulated pulse transmission it is desirable to use a system of delayed A. V. C., so that no reduction in gain is applied to signals until they are strong enough to fully operate an amplitude limiter similar to those used in FM systems. When this is the case, it is possible that pulsed signals might arrive at the receiver whose average component was not great enough to operate the A. V. C. system but which would be strong enough to be readable. In such case, even though relay 37 might fail to open, the opening of relay 36 would permit the audio frequency amplifier system to operate.

While I have described above the principles of my invention in connection with specific apparatus, and particular modifications thereof, it is to be clearly understood that this description is made only by way of example and not as a limitation on the scope of my invention.

I claim:

1. A selection system for different types of carrier modulation signals comprising a single receiver for removing the carrier frequency, a first channel, coupled to the output of said receiver, for a first type of signal, a second channel, coupled to the output of said receiver, for a second type of signal, means for blocking both channels in the absence of any signals, means for opening the first channel in response to the reception of either type of signal, and means for opening the second channel and blocking the first channel in response to signals of the second type, said second channel being a channel for time displacement modulated pulses and said means for opening the second channel including a circuit tuned to the average repetition frequency of said pulses.

2. A selection system for different types of carrier modulation signals comprising a single receiver for removing the carrier frequency, a first channel, coupled to the output of said receiver, for a first type of signal, a second channel, coupled to the output of said receiver, for a second type of signal, means for blocking both channels in the absence of any signals, means for opening the first channel in response to the reception of either type of signal, and means for opening the second channel and blocking the first channel in response to signals of the second type, said second channel being a time displacement modulated pulse channel and including a demodulator for said time displacement modulated pulses, and said means for opening the second channel and blocking the first channel including a circuit tuned to the average repetition frequency of said time displacement modulated pulses, means for deriving a direct current potential from said tuned circuit, said direct current voltage having a maximum amplitude in response to pulses of the desired repetition frequency being impressed upon said tuned circuit, an electron discharge device circuit arranged in said second channel, said electron discharge circuit being normally blocked, and means for applying said direct current voltages to said electron discharge circuit whereby said maximum voltage which has a sufficient value unblocks said electron discharge circuit.

NORMAN H. YOUNG, Jr.

REFERENCES CITED

The following references are of record in the file of this patent:

UNITED STATES PATENTS

| Number | Name | Date |
|---|---|---|
| 1,986,812 | Harris | Jan. 8, 1935 |
| 2,023,448 | Starrett | Dec. 10, 1935 |
| 2,115,360 | Crosby | Apr. 26, 1938 |
| 2,125,953 | Prochnow | Aug. 9, 1938 |
| 2,129,740 | Lewis | Sept. 13, 1938 |
| 2,137,123 | Lewis | Nov. 15, 1938 |
| 2,152,515 | Wheeler | Mar. 28, 1939 |
| 2,239,907 | Van Loon | Apr. 29, 1941 |
| 2,263,633 | Koch | Nov. 25, 1941 |
| 2,318,268 | Terman | May 4, 1943 |
| 2,330,241 | Roberts | Sept. 28, 1943 |
| 2,361,653 | Roberts | Oct. 31, 1944 |
| 2,379,900 | Hansell | July 10, 1945 |
| 2,429,607 | Capen | Oct. 28, 1947 |